United States Patent
Nagayasu

(10) Patent No.: US 7,123,667 B2
(45) Date of Patent: Oct. 17, 2006

(54) RECEIVER FOR WIRELESS COMMUNICATION

(75) Inventor: Takayuki Nagayasu, Tokyo (JP)

(73) Assignee: Mitusbishi Denki Kabushiki Kaisha, Tokyo (JP)

( * ) Notice: Subject to any disclaimer, the term of this patent is extended or adjusted under 35 U.S.C. 154(b) by 854 days.

(21) Appl. No.: 10/070,449

(22) PCT Filed: Jul. 6, 2001

(86) PCT No.: PCT/JP01/05883

§ 371 (c)(1),
(2), (4) Date: Mar. 20, 2002

(87) PCT Pub. No.: WO02/09316

PCT Pub. Date: Jan. 31, 2002

(65) Prior Publication Data

US 2002/0136334 A1     Sep. 26, 2002

(30) Foreign Application Priority Data

Jul. 21, 2000   (JP) .............................. 2000-221316

(51) Int. Cl.
*H04L 27/06* (2006.01)
(52) U.S. Cl. ..................... 375/316; 375/324
(58) Field of Classification Search ................ 375/232, 375/347, 132, 346, 341, 343, 348, 349, 354, 375/362, 130, 133, 136, 147, 149, 140, 150, 375/267, 316, 324; 455/135, 137, 139, 273, 455/276.1, 65, 275, 561, 277.2; 380/34; 370/342, 208, 210
See application file for complete search history.

(56) References Cited

U.S. PATENT DOCUMENTS

| | | | | |
|---|---|---|---|---|
| 5,127,025 | A * | 6/1992 | Okanoue | 375/232 |
| 5,193,102 | A * | 3/1993 | Meidan et al. | 375/132 |
| 5,202,903 | A | 4/1993 | Okanoue | |
| 5,265,122 | A * | 11/1993 | Rasky et al. | 375/346 |
| 5,442,627 | A | 8/1995 | Viterbi et al. | |
| 5,546,429 | A * | 8/1996 | Chiasson et al. | 375/341 |
| 5,598,434 | A | 1/1997 | Kaku et al. | |
| 5,701,333 | A * | 12/1997 | Okanoue et al. | 375/347 |
| 6,038,272 | A * | 3/2000 | Golden et al. | 375/347 |
| 6,137,824 | A * | 10/2000 | Liu | 375/130 |
| 6,339,612 | B1 * | 1/2002 | Stewart et al. | 375/140 |
| 6,654,340 | B1 * | 11/2003 | Jones et al. | 370/208 |

(Continued)

FOREIGN PATENT DOCUMENTS

JP          3-14324          1/1991

(Continued)

OTHER PUBLICATIONS

Satoshi Denno et al.: "A maximum likelihood sequence estimation equalizer based on maximal ratio" The Institute of Electronics, Information and Communication Engineers 1996.

*Primary Examiner*—Temesghen Ghebretinsae
(74) *Attorney, Agent, or Firm*—Oblon, Spivak, McClelland, Maier & Neustadt, P.C.

(57) ABSTRACT

Analog processing sections (3*a* to 3*b*) generate base band analog signal from the received signal. A/D converting sections (4*a* to 4*b*) the outputs of the analog processing sections into digital signals. Soft-decision output equalizers (11*a* to 11*b*) make soft decisions on the digital signals. A combining section (12) combines the results of the soft decisions to output a soft-decision value. An error correcting section (13) performs error correction processing with respect to the soft-decision value.

4 Claims, 3 Drawing Sheets

U.S. PATENT DOCUMENTS 6,792,258 B1 * 9/2004 Nokes et al. ............ 455/277.2
7,020,459 B1 * 3/2006 Nagayasu ................... 455/413

FOREIGN PATENT DOCUMENTS

| JP | 3-241925 | 10/1991 |
| JP | 3-245619 | 11/1991 |
| JP | 3-283827 | 12/1991 |
| JP | 8-172382 | 7/1996 |
| JP | 9-500245 | 1/1997 |
| JP | 11-55169 | 2/1999 |
| JP | 11-168408 | 6/1999 |
| JP | 2000-91967 | 3/2000 |

* cited by examiner

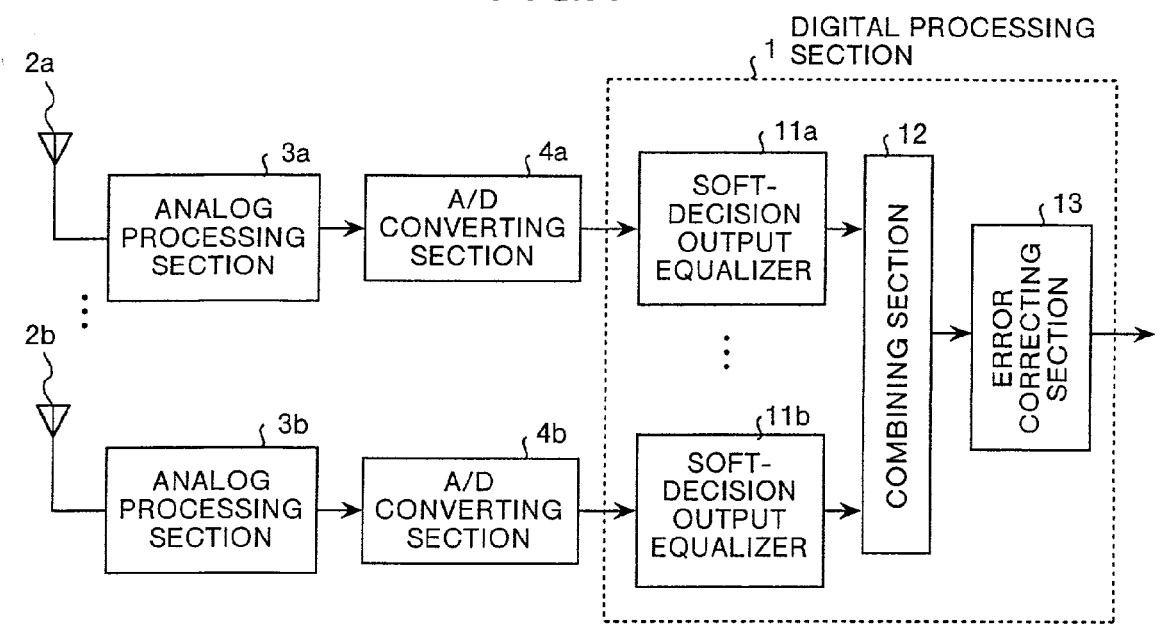
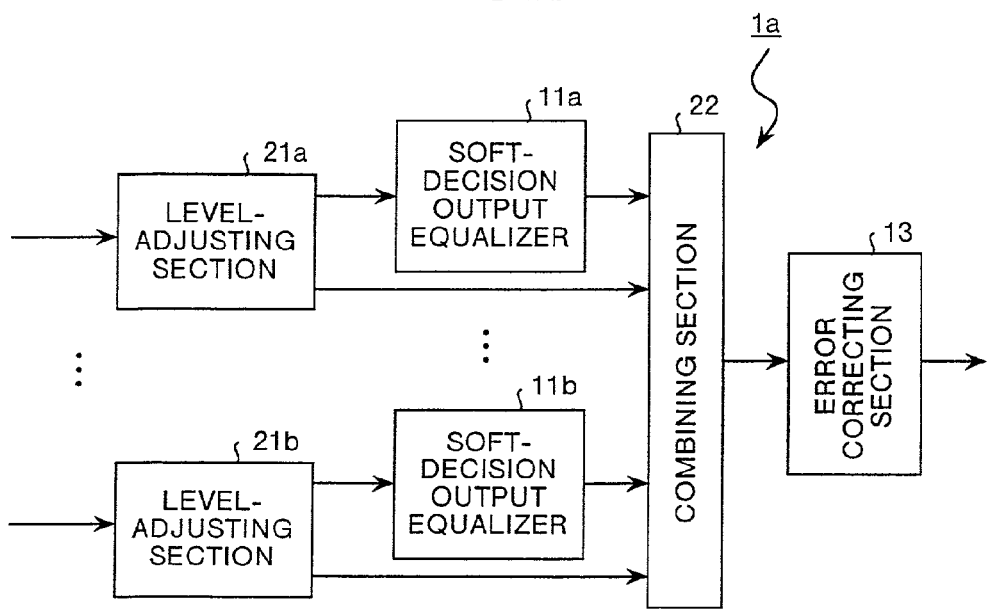

RECEIVER FOR WIRELESS COMMUNICATION

TECHNICAL FIELD

The present invention relates to a receiver which can be employed in the radio communication such as in automobile telephones, portable telephones, or cordless telephones. More particularly, this invention relates to a radio communication receiver which provides high-quality communications based on the use of diversity reception.

BACKGROUND ART

A conventional radio communication receiver (hereinafter to be simply referred to as a receiver) will be explained below. In the communication environment of portable telephones or the like, there is risk of distortion in the reception signals due to frequency selective fading which involves intersymbol interference. Persons skilled in the art have used, in order to prevent occurrence of this type of distortion, a method of demodulating a signal by utilizing an intersymbol component with an equalizer.

A receiver which uses diversity reception in the communication environment of the above frequency selective fading has been disclosed in "A Maximum Likelihood Sequence Estimation Equalizer based on Maximal Ratio Combining" (1996 general meeting of The Institute of Electronic Information Communication Engineers of Japan, B-478), by Denno and Saito ("conventional example (1)"). According to this conventional example (1), signals of two systems are received, and a maximum likelihood sequence is estimated using one equalizer. In the estimation of the maximum likelihood sequence, branch metrics corresponding to respective reception signals are calculated, and the branch metrics of the two systems are combined, thereby to realize the diversity reception.

In the mean time, there is a technique, "Equalizer and Decoder, for Mobile Communication System" that is described in Japanese Patent Application Laid-open No. 2000-91967 ("conventional example (2)"). According to the conventional example (2), an error correcting section generates reliability information of a reception signal in simultaneous with an error correction processing. This reliability information is fed back to the equalizer, and the equalizer equalizes the signal again. The equalization processing and the error correction processing are repeated.

The conventional radio communication receivers described above have had the following problems.

In the conventional example (1), one equalizer demodulates the reception signals of the two systems. Therefore, at the time of manufacturing devices having different numbers of antennas in order to realize the diversity reception, it is necessary to design and manufacture the equalizers again by matching the numbers of the antennas. This results in high manufacturing cost.

It is possible to realize the equalizers using H/W like LSI's. However, in that case, since the reception signals of the two systems are received and the demodulation processing like Viterbi algorithm is required to be carried out, the wiring becomes complex and the packaging area becomes large.

According to the conventional example (2), it is not possible to implement the diversity reception. Since the diversity reception is not possible, there is a problem that the quality of the communication can not be improved.

It is an object of the present invention to provide a radio communication receiver which can realize the reduction in manufacturing cost and reduction in the packaging area, and which can improve communication quality as compared with the conventional technique even if diversity reception is employed.

DISCLOSURE OF THE INVENTION

The radio communication receiver according to one aspect of the present invention comprises, analog signal generating units in number P (where P is a natural number) (corresponding to analog processing sections 3a to 3b in an embodiment to be described later) each of which receives a signal and generates a base band analog signal from the received signal, A/D converters in number P (corresponding to A/D converting sections 4a to 4b) each of which converts the analog signal of the corresponding analog signal generating unit into digital signals, and a demodulator (corresponding to a digital processing section 1) which demodulates the digital signal output by the corresponding A/D converter based on a desired method. The demodulator comprises, soft-decision output equalizers in number P (corresponding to soft-decision output equalizers 11a to 11b) each of which makes a soft decision on the digital signal output by the corresponding A/D converter, a combining unit (corresponding to a combining section 12) which combines the results of the soft decisions by the soft-decision output equalizers and outputs the result as a soft-decision value, and an error correcting unit (corresponding to an error correcting section 13) which performs error correction processing with respect to the soft-decision value output by the combining unit.

The radio communication receiver according to another aspect of the present invention comprises, analog signal generating units in number P (where P is a natural number) each of which receives a signal and generates a base band analog signal from the received signal, A/D converters in number P each of which converts the analog signal of the corresponding analog signal generating unit into digital signals, and a demodulator (corresponding to a digital processing section 1a) which demodulates the digital signals output by the corresponding A/D converter based on a desired method. The demodulator comprises, level-adjusting units in number P (corresponding to level-adjusting sections 21a to 21b) each of which adjusts a power level of the digital signal output by the corresponding A/D converter, soft-decision output equalizers in number P each of which makes a soft decision with respect to the signal output by the corresponding level-adjusting unit, a combining unit (corresponding to a combining section 22) which returns a result of the soft decision to a status before the level adjustment, combines the results of the soft decisions by the soft-decision output equalizers at the original power levels and outputs the result as a soft-decision value, and an error correcting unit which performs error correction processing with respect to the soft-decision value output by the combining unit.

The radio communication receiver according to another aspect of the present invention comprises, analog signal generating units in number P (where P is a natural number) each of which receives a signal and generates a base band analog signal from the received signal, A/D converters in number P each of which converts the analog signal of the corresponding analog signal generating unit into digital signals, and a demodulator (corresponding to a digital processing section 1b) which demodulates the digital signals output by the corresponding A/D converter based on a desired method. The demodulator comprises, soft-decision output equalizers in number P each of which makes a soft decision on the digital signal output by the corresponding A/D converter, noise-power estimating units in number P (corresponding to noise-power estimating sections 31a to 31b) each of which estimates noise power of the digital signal output by the corresponding A/D converter, a combining unit (corresponding to a combining section 32) which divides results of the soft decisions by corresponding noise power respectively, combines the results of the division to output a soft-decision value, and an error correcting unit which performs error correction processing with respect to the soft-decision value output by the combining unit.

The radio communication receiver according to another aspect of the present invention comprises, analog signal generating units in number P (where P is a natural number) each of which receives a signal and generates a base band analog signal from the received signal, A/D converters in number P each of which converts the analog signal of the corresponding analog signal generating unit into digital signals, and a demodulator (corresponding to a digital processing section 1c) which demodulates the digital signals output by the corresponding A/D converter based on a desired method. The demodulator comprises, soft-decision output equalizers in number P (corresponding to soft-decision output equalizers 41a to 41b) each of which makes a soft decision on the digital signal output by the corresponding A/D converter based on common reliability information that is fed back after error correction, a combining unit (corresponding to a combining section 42) which combines the results of the soft decisions by the soft-decision output equalizers and outputs the result as a soft-decision value, and an error correcting unit (corresponding to an error correcting section 43, subtractors 51 and 55, a deinterleaver 52, a soft-decision output decoding section 53, are-encoding section 54, and an interleaver 56) which performs error correction processing with respect to the soft-decision value output by the combining unit, generates reliability information of decoded bits, and feeds back the reliability information to the soft-decision output equalizers.

BRIEF DESCRIPTION OF THE DRAWINGS

FIG. 1 is a diagram which shows a structure of a receiver relating to the present invention, and a structure of a digital processing section according to a first embodiment;

FIG. 2 is a diagram which shows a structure of a digital processing section according to a second embodiment;

BEST MODE FOR CARRYING OUT THE INVENTION

Figure 3:
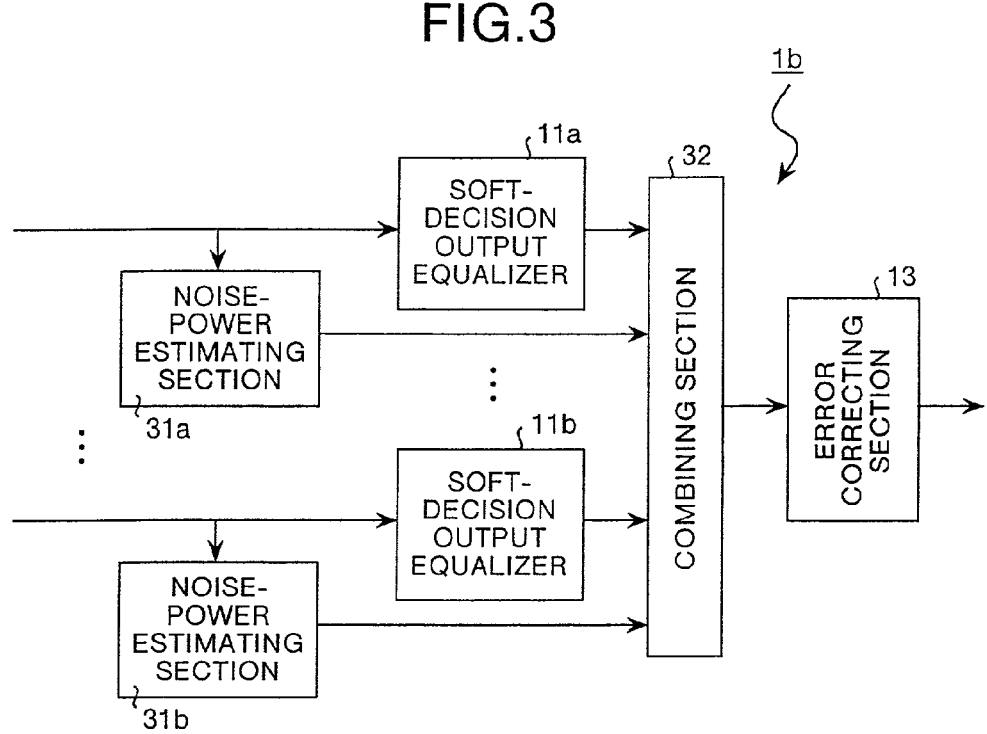
FIG. 3 is a diagram which shows a structure of a digital processing section according to a third embodiment.

Embodiments of a radio communication receiver ("receiver") relating to the present invention will be explained in detail below with reference to the accompanying drawings. It should be noted that the present invention is not limited to these embodiments.

First Embodiment:

FIG. 1 is a diagram which shows a structure of a receiver relating to the present invention. More specifically, FIG. 1 shows a structure of a digital processing section 1 according to a first embodiment. In FIG. 1, a reference numeral 1 denotes a digital processing section of the second embodiment, 2a, ..., and 2b denote antennas, 3a, ..., and 3b denote analog processing sections, and 4a, ..., and 4b denote analog/digital converting sections (hereinafter to be referred to as A/D converting sections). In the digital processing section 1, reference numerals 11a, ..., and 11b denote soft-decision output equalizers, 12 denotes a combining section, and 13 denotes an error correcting section.

An outline of the operation of the receiver relating to the present invention will be briefly explained. The analog processing sections 3a to 3b receive reception waves via P (a natural number) antennas 2a to 2b respectively. The analog processing sections 3a to 3b limit band, downconvert, and convert the reception signals into analog signals of the base band respectively. The A/D converting sections 4a to 4b convert the analog signals of the base band into digital reception signals (hereinafter to be simply referred to as reception signals). Last, the digital processing section 1 receives the P reception signals, and carries out demodulation and error correction according to a predetermined method.

The structure and the operation of the digital processing section 1 of the second embodiment will be explained in detail. The soft-decision output equalizers 11a, ..., and 11b that correspond to P reception signals receive respective reception signals, and output soft-decision values by taking into account distortion due to a multi-path like frequency selective fading. The soft-decision output equalizers 11a to 11b output these soft-decision values to the combining section 12.

For the soft-decision output equalizers 11a to 11b, it is possible to use equalizers of known art that utilize the algorithms of SOVA (Soft-Output Viterbi Algorithm), MAP (Maximum a Posteriori), Max-log-MAP, and Log-MAP. It is also possible to use equalizers which are the modification of these equalizers. It is possible to use equalizers which output hard decisions, like a DFE (Decision-Feedback Equalizer) that carries out MLSE (Maximum-Likelihood Sequence Estimation) and DFSE (Decision-Feedback Sequence Estimation, or DDFSE (Delayed Decision-Feedback Sequence Estimation), an LVE (List-output Viterbi Equalizer) which carries out RSSE (Reduced-State Sequence Estimation), and an equalizer which utilizes M algorithm. It is also possible to use equalizers which have been modified to be able to output soft-decision values.

The combining section 12 which has received the P soft-decision values sums up the soft-decision values, and outputs a result of this calculation to the error correcting section 13 as a soft-decision value after the combining. The error correcting section 13 executes known error correction processing like deinterleaving and decoding.

As explained above, the present embodiment realizes the diversity reception which combines the soft-decision values that are the outputs of the equalizers. Based on the diversity reception, it is possible to obtain satisfactory communication quality. Further, in the case of manufacturing a plurality of types of devices having different numbers of antennas, it is possible to demodulate the reception signals by using a common equalizer. Therefore, it becomes possible to substantially reduce the manufacturing cost as compared with the conventional practice of manufacturing equalizers by matching the numbers with the numbers of antennas. Further, as the equalization processing of only the reception signal of one system is carried out based on the combining of the soft-decision values, it becomes possible to reduce the packaging area of the equalizers. As a result, it becomes possible to reduce the total packaging area of the device.

Second Embodiment:

FIG. 2 is a diagram which shows a structure of a digital processing section 1a according to a second embodiment. In FIG. 2, a reference numeral 1a denotes a digital processing section of the second embodiment, 21a, . . . , and 21b denote level-adjusting section, and 22 denotes a combining section. Portions similar to those of the first embodiment are attached with like reference numerals, and their explanation will be omitted. The receiver as a whole carries out a similar operation to that of the first embodiment, and therefore, the explanation of this operation will be omitted. Only the portions different from those of the first embodiment will be explained below.

The operation of the digital processing section 1a of the second embodiment will be explained in detail below. The level-adjusting sections 21a, . . . , and 21b carry out level adjustments to P reception signals respectively, and output results of the level adjustments to the combining section 22. The combining section 22 receives soft-decision values of the P systems which are output from soft-decision output equalizers 11a to 11b like in the first embodiment, and level adjustments of the P systems which are output from the level-adjusting sections 21a to 21b, and combines the soft-decision value in the following manner.

When the level-adjusting sections 21a to 21b have carried out level adjustments of the reception signals using level adjustment values A1, . . . , and AP, as shown in the following equation (1), the combining section combines the soft-decision values as shown in the equation (2).

$$ri'(n) = ri(n) \times Ai \quad (1)$$

$$s(n) = \Sigma\{si(n)/(Ai \times Ai)\} \quad (2)$$

where, i expresses i=1, 2, . . . , P, ri(n) expresses a reception signal at time n, ri'(n) expresses a reception signal after level adjustment at time n, $\Sigma$ expresses sum of i=1, 2, . . . , P, s (n) expresses a soft-decision value after the combining, and si (n) expresses a soft-decision value at time n which is output from each soft-decision output equalizer.

As explained above, according to the present embodiment, it is possible to obtain similar effects to those of the first embodiment. As the soft decision is made using the reception signal after the level adjustment, it is possible to obtain a soft-decision value in higher precision. Therefore, it is possible to provide communications in higher quality.

While the level-adjusting sections 21a, . . . , and 21b execute the level adjustments of reception signals in the present embodiment, analog processing sections 3a, . . . , and 3b can also execute these level adjustments in place of the level-adjusting sections. In this case, the analog processing sections 3a, . . . , and 3b output level adjustment values to the combining section 22, in addition to the analog signals of the base band.

Third Embodiment:

FIG. 3 is a diagram which shows a structure of a digital processing section 1b according to a third embodiment. In FIG. 3, a reference numeral 1b denotes a digital processing section of the third embodiment, 31a, . . . , and 31b denote noise-power estimating sections, and 32 denotes a combining section. Portions similar to those of the first embodiment are attached with like reference numerals, and their explanation will be omitted. The receiver as a whole carries out a similar operation to that of the first embodiment, and therefore, the explanation of this operation will be omitted. Only the portions different from those of the first embodiment will be explained below.

The operation of the digital processing section 1b of the third embodiment will be explained in detail below. The noise-power estimating sections 31a to and 31b estimate noise power of received reception signals respectively, and output results of the estimates to the combining section 32. The combining section 32 receives soft-decision values of the P systems which are output from soft-decision output equalizers 11a to 11b like in the first embodiment, and estimated noise powers N1, . . . , and NP of the P systems which are output from the noise-power estimating sections 31a to 31b, and combines the soft-decision value in the following manner.

$$S(n) = \Sigma\{si(n)/Ni\} \quad (3)$$

where, i expresses i=1, . . . , and P , $\Sigma$ expresses sum of i=1, . . . , and P, s (n) expresses a soft-decision value after the combining, and si (n) expresses a soft-decision value at time n which is output from each soft-decision output equalizer.

As explained above, according to the present embodiment, it is possible to obtain similar effects to those of the first embodiment. As each soft-decision value is weighted according to the estimated noise power, it is possible to obtain a result of the combining in higher precision. Therefore, it is possible to provide communications in higher quality.

Figure 4:
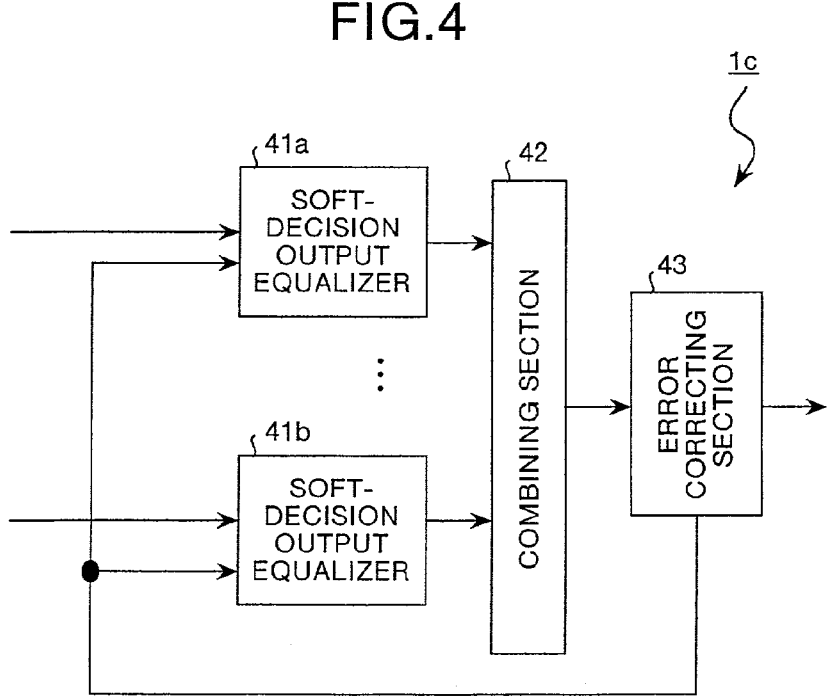
FIG. 4 is a diagram which shows a structure of a digital processing section according to a fourth embodiment.
Figure 5:
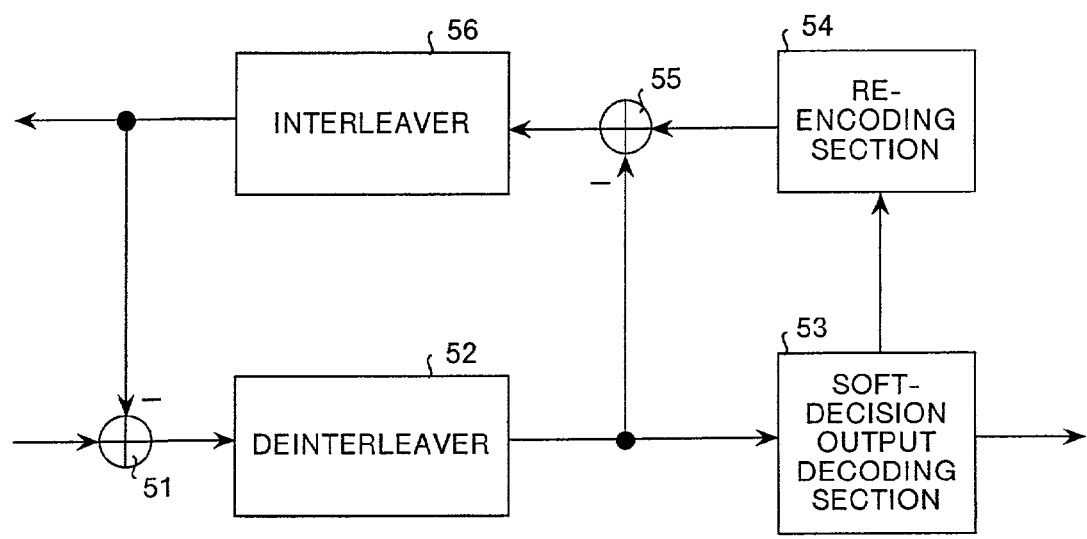
FIG. 5 is a diagram which shows a structure of an error correcting section according to the fourth embodiment.

Fourth Embodiment:

FIG. 4 is a diagram which shows a structure of a digital processing section 1c according to a fourth embodiment. In FIG. 4, a reference numeral 1c denotes a digital processing section of the fourth embodiment, 41a, . . . , and 41b denote soft-decision output equalizers which are different from those shown in FIGS. 1 to 3, 42 denotes a combining section, and 43 denotes an error correcting section. FIG. 5 is a diagram which shows a structure of the error correcting section 43. Reference numbers 51 and 55 denote subtractors, 52 denotes a deinterleaver, 53 denotes a soft-decision output decoding section, 54 denotes a re-encoding section, and 56 denotes an interleaver. Portions similar to those of the first embodiment are attached with like reference numerals, and their explanation will be omitted. The receiver as a whole carries out a similar operation to that of the first embodiment, and therefore, the explanation of this operation will be omitted. Only the portions different from those of the first embodiment will be explained below.

The operation of the digital processing section 1c will be explained. The soft-decision output equalizers 41a to 41b that correspond to P reception signals receive respective reception signals, and reliability information of the reception signals which are output from the error correcting section 43 to be described later. The soft-decision output equalizers 41a to 41b output soft-decision values by taking into account distortion due to a multi-path like frequency selective fading, and output these soft-decision values to the combining section 42. The initial value of the reliability information of the reception signal is 0, for example. For the soft-decision output equalizers 41a to 41b, the equalizers similar to those used in the first embodiment will be used.

The combining section 42 which has received the P soft-decision values sums up the soft-decision values, and outputs a result of this calculation to the error correcting section 43 as a soft-decision value after the combining. The error correcting section 43 executes the error correction processing like deinterleaving and decoding, and feeds back a result of the processing to the soft-decision output equalizers 41a to 41b as common reliability information.

The operation of the error correcting section 43 of the fourth embodiment will be explained. First, the subtractor 51 subtracts the reliability information of the reception signal output from the interleaver 56, from a result of combined soft-decision values obtained by the combining section 42. The calculation is carried out by assuming that the initial value of the reliability information of the reception signal is 0, for example.

The deinterleaver 52 re-arranges the soft-decision value after the subtraction, in an opposite order to that of the interleaving at a transmitter side. In other words, the deinterleaver 52 returns the soft-decision value to the order of an original information bit sequence. The soft-decision output decoding section 53 outputs a result of the calculation of the reliability information of the decoded bit and a result of the decoding, based on the soft-decision value after the deinterleaving. The re-encoding section 54 receives there liability information, encodes there liability information based on the coding rule, and outputs a result of the encoding to the subtractor 55 as the reliability information of the encoded bit. The subtractor 55 subtracts a soft-decision value which is output from the deinterleaver 52, from the reliability information of the encoded bit, and outputs a result of this subtraction to the interleaver 56. The interleaver 56 re-arranges the soft-decision value in the same order as that of the interleaving at the transmitter side, and outputs a result of this to each soft-decision output equalizer as common reliability information of the reception signal.

According to the fourth embodiment, it is possible to obtain similar effects to those of the first embodiment. Further, the reliability of the reception signal is calculated in the error correction processing, and this reliability information is fed back to the equalizer. Thereafter, the equalization processing and the error correction processing are repeated. Based on this structure, it is possible to obtain both effects of the repetition processing and the diversity processing. Therefore, it is possible to provide communications in higher quality.

As explained above, according to one aspect of the present invention, it is possible to obtain satisfactory communication quality based on the diversity effect, by realizing the diversity reception which combines results of soft decisions that are output from the soft-decision output equalizers. Further, in the case of manufacturing a plurality of types of devices having different numbers of antennas, it is possible to demodulate reception signals by using a common soft-decision output equalizing unit. Therefore, it becomes possible to substantially reduce the manufacturing cost as compared with the conventional practice of manufacturing equalizers by matching the numbers with the numbers of antennas. Further, as the equalization processing of only the reception signal of one system is carried out based on the combining of the soft-decision values, it becomes possible to reduce the packaging area of the soft-decision output equalizing unit. As a result, there is an effect that it becomes possible to reduce the total packaging area of the device.

According to another aspect of the present invention, as the soft decision is made using the reception signal after the level adjustment, it is possible to obtain a soft-decision value in higher precision. Therefore, there is an effect that it is possible to provide communications in higher quality.

According to still another aspect of the present invention, as each soft-decision value is weighted according to the estimated noise power, it is possible to obtain a result of the combining in higher precision. Therefore, there is an effect that it is possible to provide communications in higher quality.

According to still another aspect of the present invention, the reliability of the reception signal is calculated in the error correction processing, and this reliability information is fed back to the equalizer. Thereafter, the equalization processing and the error correction processing are repeated. Based on this structure, it is possible to obtain both effects of the repetition processing and the diversity processing. Therefore, there is an effect that it is possible to provide communications in higher quality.

INDUSTRIAL APPLICABILITY

The radio communication receiver relating to the present invention is effective in the radio communication field like an automobile telephone, a portable telephone, and a cordless telephone. Further, this receiver is suitable for the manufacturing cost reduction, the packaging area reduction, and improvement of the communication quality.

The invention claimed is:

1. A radio communication receiver comprising:
analog signal generating units in number P (where P is a natural number more than one) each of which receives a signal and generates a base band analog signal from the received signal;
A/D converters in number P each of which converts the analog signal of the corresponding analog signal generating unit into digital signals; and
a demodulator which demodulates the digital signal output by the corresponding A/D converter based on a desired method, the demodulator comprising;
soft-decision output equalizers in number P each of which makes a soft decision on the digital signal output by the corresponding A/D converter;
a combining unit which sums up the results of the soft decisions by the soft-decision output equalizers and outputs the result as a soft-decision value; and
an error correcting unit which performs error correction processing with respect to the soft-decision value output by the combining unit.

2. A radio communication receiver comprising:
analog signal generating units in number P (where P is a natural number) each of which receives a signal and generates a base band analog signal from the received signal;
A/D converters in number P each of which converts the analog signal of the corresponding analog signal generating unit into digital signals; and
a demodulator which demodulates the digital signal output by the corresponding A/D converter based on a desired method, said demodulator comprising:
level-adjusting units in number P each of which adjusts a power level of the digital signal output by the corresponding A/D converter;
soft-decision output equalizers in number P each of which makes a soft decision with respect to the signal output by the corresponding level-adjusting unit;
a combining unit which returns a result of the soft decision to a status before the level adjustment, combines the results of the soft decisions by the soft-decision output equalizers at the original power levels and outputs the result as a soft-decision value; and an error correcting unit which performs error correction processing with respect to the soft-decision value output by the combining unit.

3. A radio communication receiver comprising:

analog signal generating units in number P (where P is a natural number) each of which receives a signal and generates a base band analog signal from the received signal;

A/D converters in number P each of which converts the analog signal of the corresponding analog signal generating unit into digital signals; and a demodulator which demodulates the digital signal output by the corresponding A/D converter based on a desired method, said demodulator comprising:

soft-decision output equalizers in number P each of which makes a soft decision on the digital signal output by the corresponding A/D converter;

noise-power estimating units in number P each of which estimates noise power of the digital signal output by the corresponding A/D converter;

a combining unit which divides results of the soft decisions by corresponding noise power respectively, and combines the results of the division to output a soft-decision value; and an error correcting unit which performs error correction processing with respect to the soft-decision value output by the combining unit.

4. A radio communication receiver comprising: analog signal generating units in number P (where P is a natural number) each of which receives a signal and generates a base band analog signal from the received signal;

A/D converters in number P each of which converts the analog signal of the corresponding analog signal generating unit into digital signals; and a demodulator which demodulates the digital signal output by the corresponding A/D converter based on a desired method, said demodulator comprising:

soft-decision output equalizers in number P each of which makes a soft decision on the digital signal output by the corresponding A/D converter based on common reliability information that is fed back after error correction;

a combining unit which combines the results of the soft decisions by the soft-decision output equalizers and outputs the result as a soft-decision value; and an error correcting unit which performs error correction processing with respect to the soft-decision value output by the combining unit, generates reliability information of decoded bits, and feeds back the reliability information to the soft-decision output equalizers.

* * * * *